United States Patent [19]

Nakanishi

[11] Patent Number: 5,214,548
[45] Date of Patent: May 25, 1993

[54] TAPE CASSETTE LOADING MECHANISM IN TAPE PLAYER

[75] Inventor: Yasuyuki Nakanishi, Hyogo, Japan

[73] Assignee: Mitsubishi Denki Kabushiki Kaisha, Chiyoda, Japan

[21] Appl. No.: 764,089

[22] Filed: Sep. 23, 1991

Related U.S. Application Data

[63] Continuation of Ser. No. 281,385, Dec. 8, 1988, abandoned.

[30] Foreign Application Priority Data

| Dec. 9, 1987 | [JP] | Japan | 62-312805 |
| Dec. 9, 1987 | [JP] | Japan | 62-312806 |
| Dec. 9, 1987 | [JP] | Japan | 62-312807 |
| Dec. 9, 1987 | [JP] | Japan | 62-312808 |
| Dec. 9, 1987 | [JP] | Japan | 62-312809 |
| Dec. 9, 1987 | [JP] | Japan | 62-312810 |
| Dec. 9, 1987 | [JP] | Japan | 62-312811 |

[51] Int. Cl.⁵ ............................. G11B 5/008
[52] U.S. Cl. ................... 360/96.5; 360/96.6
[58] Field of Search ............ 360/88, 90, 93, 96.1, 360/96.5, 96.6

[56] References Cited

U.S. PATENT DOCUMENTS

| 3,740,495 | 6/1973 | Kihara | 360/85 |
| 4,614,991 | 9/1986 | Murakami | 360/96.5 X |
| 4,794,478 | 12/1988 | Kamezawa et al. | 360/96.6 |

FOREIGN PATENT DOCUMENTS

| 0177133 | 4/1986 | European Pat. Off. . |
| 0190031 | 8/1986 | European Pat. Off. . |
| 0204585 | 12/1986 | European Pat. Off. . |
| 65778 | 7/1972 | France . |
| 62-57951 | 4/1987 | Japan . |
| 0211154 | 9/1988 | Japan | 360/96.6 |

Primary Examiner—Andrew L. Sniezer
Attorney, Agent, or Firm—Burns, Doane, Swecker & Mathis

[57] ABSTRACT

A tape cassette loading mechanism in a tape player is disclosed for loading a tape cassette which encloses a magnetic tape therein. The tape cassette includes an upper case, a lower case, a slider mounted slidably on the lower case and a lid mounted pivotably with respect to those cases. The tape cassette loading mechanism include a lower holder having lugs formed on the bottom thereof for engagement with retaining apertures formed in the slider and also having bent pieces formed at the front end thereof to retain the front end portion of the slider, and an upper holder formed separately from the lower holder to support the upper case. The lower and upper holders are movable relative to each other to open the slider of the tape cassette.

14 Claims, 5 Drawing Sheets

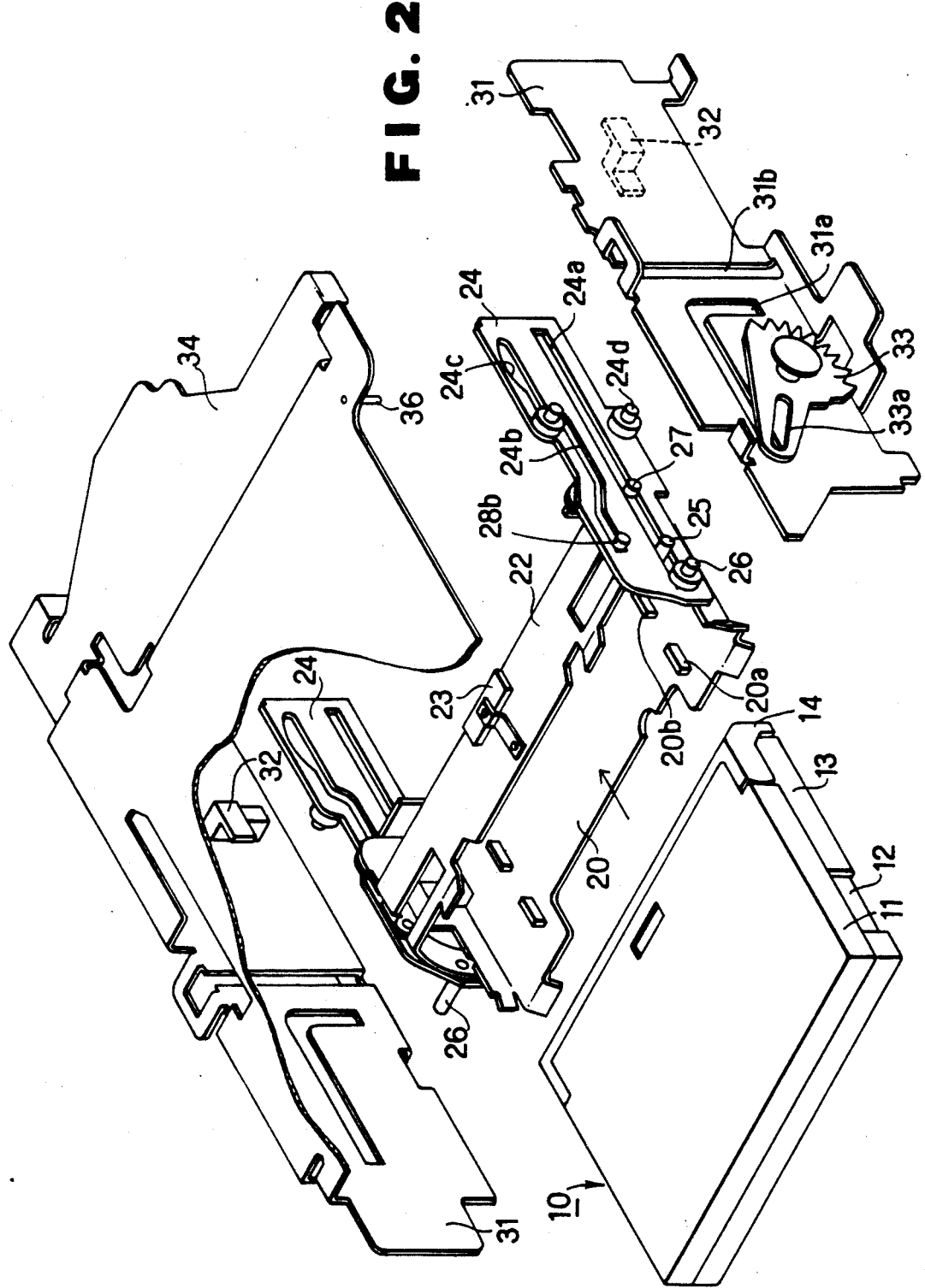

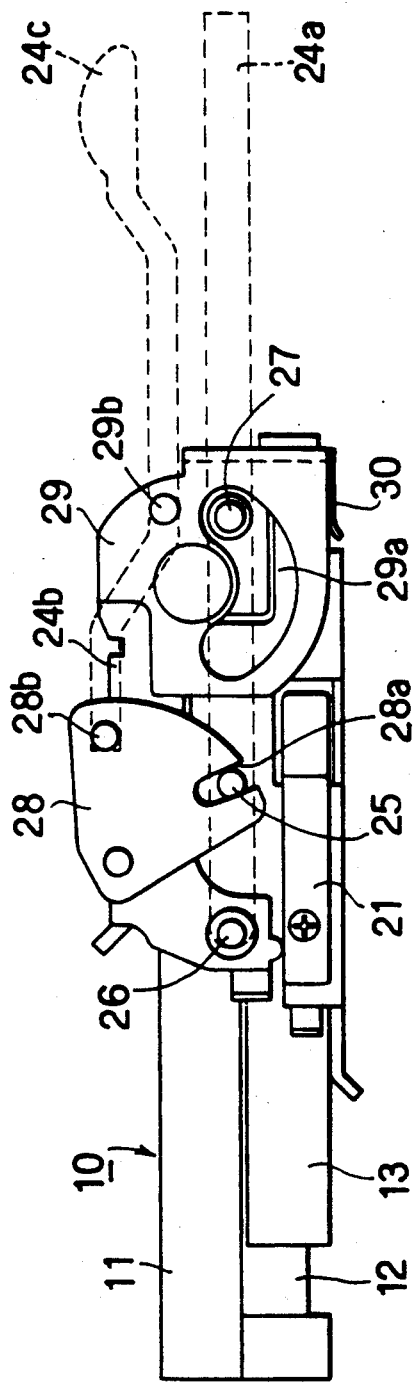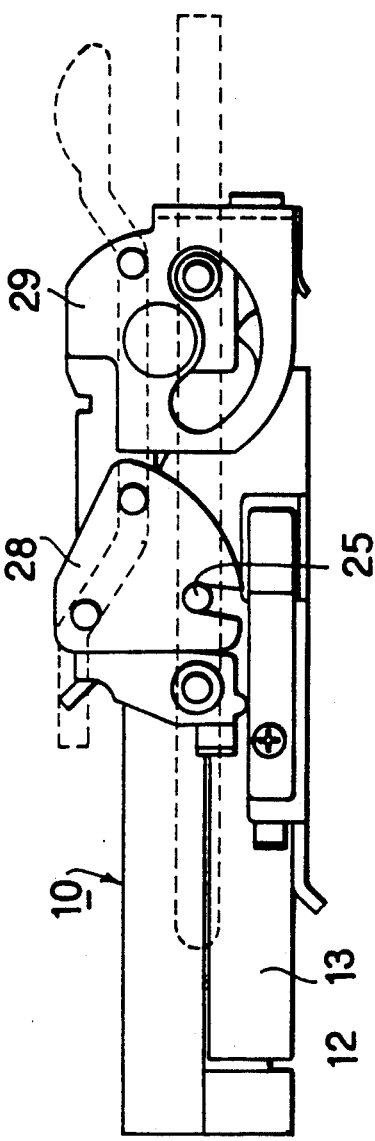

TAPE CASSETTE LOADING MECHANISM IN TAPE PLAYER

This application is a continuation of application Ser. No. 07/281,385, filed Dec. 8, 1988 now abandoned.

BACKGROUND OF THE INVENTION

1. Field of the Invention

The present invention relates to a tape cassette loading mechanism in a tape player for loading a recorded tape enclosed in a tape cassette to a playing position.

2. Description of the Prior Art

FIG. 1 shows an outline of a tape cassette used for a digital audio tape player. In the same figure, a tape cassette 10 is composed of upper and lower cases 11 and 12 for enclosing therein a magnetic tape wound round a pair of tape reels, a slider 13 mounted slidably over the outer peripheral surface of the lower case 12, and a lid 14 disposed in a front opening defined by the upper and lower cases 11 and 12. As can be seen from FIG. 1, the upper case 11 and the slider 13 cooperate to define side surfaces 16 of the tape cassette. The lower case 12 is provided with downwardly projecting lugs 12a, while the slider 13 is formed with first retaining apertures 13a and second like apertures 13b for engagement with the lugs 12a to restrict the position of the slider 13. In a second position in which the lugs 12a are engaged with the second retaining apertures 13b, the slider 13 abuts the lid 14 to enclose the magnetic tape completely, while in a first position in which the lugs are engaged with the first retaining apertures 13a, the slider 13 is completely spaced away from the lid 14, permitting the lid 14 to pivot about fulcrums 14a thereof. The slider 13 is further formed with apertures 13c in opposed relation to reel hubs 15 of the reels with the magnetic tape wound thereon, through which apertures 13c are inserted reel rotating shafts. The slider 13 is urged in a direction of abutment with the lid 14 by means of a spring and the magnetic tape is disposed so as to travel along the inner peripheral surface of the lid 14 from the interior of the lower case 12 as indicated by a dot-dash line. Further, the lid 14 has grooves 14b formed in positions opposed to the lugs 12a at a depth substantially corresponding to the plate thickness of the slider 13 and also has grooves 14c formed at a depth not causing the magnetic tape to be exposed.

In recording or playback of information in the tape player using the tape cassette 10 constructed as above, it is necessary that the magnetic tape be exposed from the tape cassette 10 and brought into contact with the magnetic head. To this end it is necessary that the slider 13 be held in the first position and the lid 14 pivoted upon loading of the tape cassette 10.

For using such tape player as a player for an automobile, e.g. a passenger car, it is necessary to reduce the size of the entire apparatus because of a limited mounting space in the automobile.

SUMMARY OF THE INVENTION

The present invention has been accomplished in view of the above-mentioned point and it is the object thereof to reduce the size of the tape cassette loading mechanism thereby providing a compact and light-weight tape player.

In order to achieve the above-mentioned object, a tape player according to the present invention includes a lower holder for holding a slider of a tape cassette and an upper holder constructed separately from the lower holder to hold a case of the tape cassette, the lower holder being movable relative to the upper holder.

In the said tape player, since the upper and lower holders are constructed separately, the lower holder can be moved in a relative manner, so it is possible to move the slider to the magnetic tape exposed position effectively by a tape cassette inserting operation and reduce the tape insertion distance thereby attaining a compact construction of the apparatus.

In the tape player of the invention, moreover, lugs for engagement with retaining apertures of the slider are formed on the bottom of the lower holder, and bent pieces for retaining the front end of the slider are formed on the front end portion of the lower holder, and the whole of the lower holder is U-shaped. The upper holder is also U-shaped as a whole and supports the lower holder. The tape player is further provided with guide plates along the side walls of the lower and upper holders for holding those holders movably in the tape cassette inserting direction. One of the opposed side walls on each side of the lower and upper holders is formed with a first projection, and the other is formed with a pair of second projections having a space therebetween. The first projection is engaged in the space between the second projections such that the space forms a predetermined moving space for the first projection. The slider of the tape cassette is opened by a relative movement of the said moving space.

Thus, in the tape player of the invention, since the first and second projections are formed at one and the other, respectively, of the opposed side walls on each side of both holders, and are engaged with each other through a predetermined moving space, the tape cassette slider can be opened effectively during the movement in the moving space. Besides, the side walls of the lower and upper holders can be reduced in size in their wall thickness direction because they are not superimposed one on the other laterally.

In the tape player of the invention, moreover, one of the opposed side walls on each side of the lower and upper holders is formed with a first projection and the other formed with a second projections having a space therebetween, the first projection and being engaged with the space such that the space forms a predetermined moving space for the first projection between the second projection, and pins are attached to the first projection and the other side wall face in positions equal in height to the first projection, the said pins being brought into engagement with a linear guide slot formed in each guide plate.

Thus, in the tape player of the invention, the lower and upper holders are guided along the same guide slot of each guide plate and both holders are moved in a relative manner within the predetermined spaces, whereby not only the tape cassette slider can be opened effectively but also the tape cassette inserting distance can be shortened to attain the reduction in size of the apparatus.

Further, a tape player according to the present invention includes a U-shaped lower holder having a bottom and both side walls for supporting a slider, the side walls being each formed with a first projection at an intermediate part thereof; first pins projecting from both side walls of the lower holder; a U-shaped upper holder formed separately from the lower holder and having both side walls engaged with the first projections and also having an upper surface portion for supporting an upper case; shift levers attached pivotably to the upper holder to support the first pins movably; second pins fixed to the shift levers respectively; and guide plates disposed along the side walls of the lower and upper holders and each having a stepped guide slot continuous through an inclined portion and a linear guide slot, the first pins being brought into engagement with the linear guide slots of the guide plates and the second pins into engagement with the stepped guide slots of the same plate, wherein the movement of the second pins along the inclined portions with movement of the holders causes the shift levers to pivot, thus causing the lower holder to move in the direction opposite to the advancing direction of the tape cassette in a relative relation to the upper holder.

Thus, in the said tape player according to the present invention, the first pins are engaged with the linear guide slots of the guide plates and the second pins attached to the shift levers are engaged with the stepped guide slots, whereby the shift levers can be moved when the second pins move along the inclined portions of the stepped guide slots. This pivotal motion causes the first pins to move in a relative manner, thus permitting the lower holder to move in the direction opposite to the inserting direction of the tape cassette. Consequently, the tape cassette slider can be opened without enlarging the tape cassette inserting distance.

Further, a tape player according to the present invention includes a U-shaped lower holder which supports a slider; a U-shaped upper holder formed separately from the lower holder to support the upper case; L-shaped arms mounted rotatably on the front end side of the upper holder; pins attached to the outsides of the arms; resilient members mounted on free end sides of the arms and engaged with the lower end face of the lid; and guide plates disposed along the side walls of the lower and upper holders and each having a stepped guide slot continuous through an inclined portion and also having a linear guide slot, the said pins being brought into the stepped guide slots of the guide plates, wherein the movement of the pins along the inclined portions of the stepped guide slots with movement of the holders causes the arms to pivot to open or close the lid.

Thus, in the said tape player according to the present invention, the pins attached to the arms are brought into engagement with the stepped guide slots and are guided along the inclined portions of the same slots, whereby the arms can be pivoted with respect to the upper holder thereby permitting the tape cassette lid to be opened and closed.

The tape player of the invention further includes side plates disposed along the side walls of the guide plates to guide the guide plates in the vertical direction and also includes retaining pieces projecting inside the side plates, wherein the aforesaid pins are brought into engagement with the stepped guide slots of the guide plates and are allowed to move along the inclined portions of the stepped guide slots with movement of the holders, whereupon the aforesaid arms are rotated slightly, and with a vertical movement of the guide plates the arms are rotated completely in engagement with the aforesaid retaining pieces to open the aforesaid lid.

Thus, in the above tape player according to the present invention, after slightly rotated by the inclined portions of the guide slots, the arms are rotated completely in engagement with the retaining pieces by a vertical movement of the guide plates, whereby it becomes possible to completely open the tape cassette lid supported by the arms.

A tape player according to the present invention further includes, in addition to the aforesaid lower holder, first pins, upper holder, shift levers and second pins, third pins projecting from the front end-side side wall portions of the upper holder, arms attached rotatably to the upper holder, fourth pins fixed to the arms, and guide plates disposed along the side walls of the lower and upper holders and each having a stepped guide slot continuous through two inclined portions and a linear guide slot formed in parallel with the stepped guide slot, the first and third pins being brought into engagement with the linear guide slots of the guide plates, the second and fourth pins being brought into engagement with the stepped guide slots of the guide plates, wherein the shift levers are pivoted as the second pins move along one said inclined portions with movement of the holders, thereby causing the lower holder to move in the direction opposite to the advancing direction of the tape cassette relative to the upper holder, while the arms are rotated as the fourth pins move along the other of the inclined portions of the guide slots, to thereby open or close the lid.

Thus, in the said tape player according to the present invention, when the second pins move along one inclined portions of the stepped guide slots in the guide plates, the lower holder is moved relative to the upper holder through the shift levers, while when the fourth pins move along the other inclined portions, the arms are rotated, thereby permitting the tape cassette slider and lid to be opened and closed.

BRIEF DESCRIPTION OF THE DRAWINGS

FIG. 2 is an exploded perspective view showing a tape cassette loading mechanism according to an embodiment of the present invention;

FIGS. 5, 6, 7a, 7b and 8a, 8b are side views showing operating conditions of a principal portion in FIG. 2.

DETAILED DESCRIPTION OF THE PREFERRED EMBODIMENT

An embodiment of the present invention will be described in detail hereinunder with reference to FIGS. 2 to 8.

Figure 3:
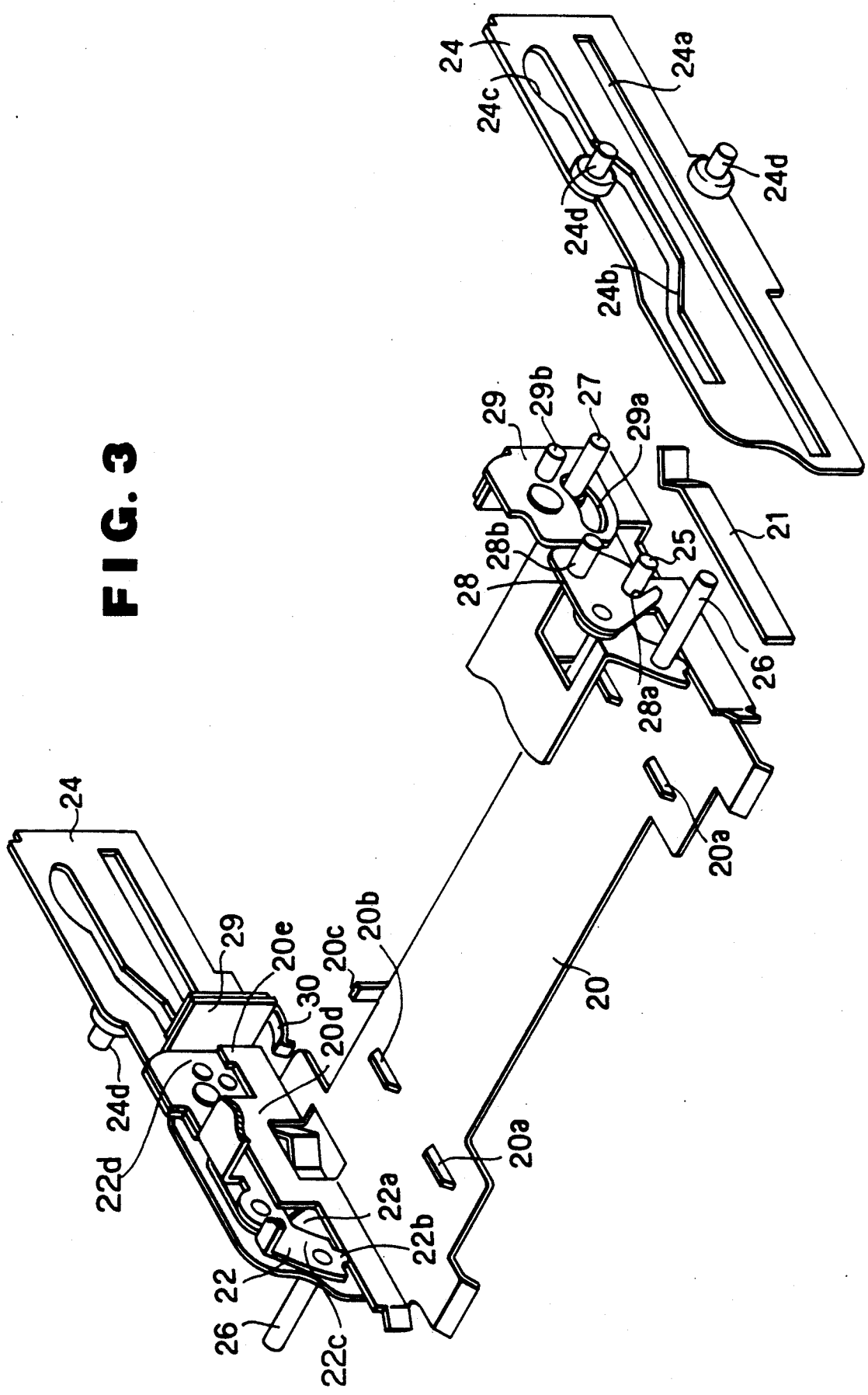
Figure 7:
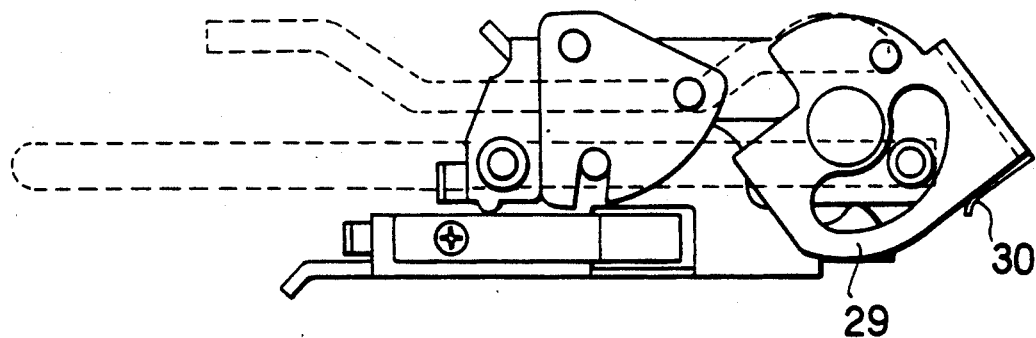
Figure 7:
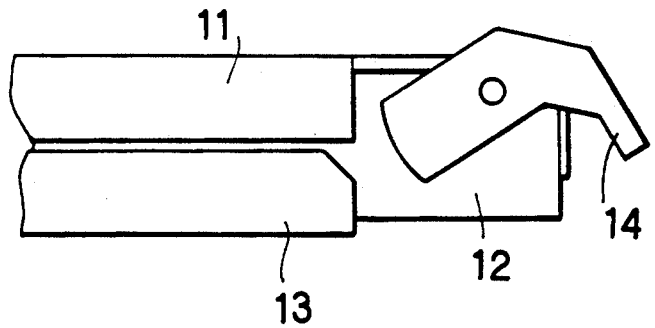

In FIG. 2, the reference numeral 20 denotes a U-shaped lower holder which supports a tape cassette 10. As shown in FIG. 3, two pairs of embossed lugs 20a and 20b are formed on the bottom of the lower holder and a pair of bent pieces 20c are formed at the front portion of the same holder; further, elastic plates 21 are projecting from both side walls of the lower holder. Numeral 22 denotes a U-shaped upper holder which holds the tape cassette 10 in cooperation with the lower holder 20, with a hook 23 being attached to the upper surface of the upper holder which hook is capable of undergoing elastic deformations. The side walls of the upper holder 22 are formed in U shape, each having a pair of second projections 22c, 22d having a space 22a therebetween. a first projection 20d of each side wall of the lower holder 20 engages the space 22a between the second projections 22c, 22d such that the space 22a forms a predetermined moving space. And the opposed faces of each side walls of both holders are formed with arcuate lugs 20e and 22b to reduce the moving friction. Numeral 24 denotes a guide plate and a pair of guide plates 24 are disposed on both sides of the holders 20 and 22. The guide plates 24 are each formed with a linear guide slot 24a, a stepped guide slot 24b which is continuous through inclined portions, and an elliptic guide slot 24c formed at the front end of the guide slot 24b. Further, a pair of pins 24d are formed on the outside faces of the guide plates. Through the guide slots 24a of the guide plates 24 are inserted pins (first pins) 25 attached to the lower holder 20 and pins (third pins) 26 and 27 attached to the upper holder 22.

In FIG. 3, numeral 28 denotes a shift lever attached pivotably to the upper holder 22. The shift lever 28 is formed with a slot 28a for engagement with each pin 25 and with a pin (second pin) 28b for engagement with each guide slot 24b being attached to the shift lever. Numeral 29 denotes an L-shaped arm provided rotatably on the front end side of the upper holder 22; the arm 29 has an arcuate slot 29a for insertion therethrough of each pin 27 and with a pin (fourth pin) 29b for engagement with the guide slots 24b and 24c being attached to the arm 29. Numeral 30 denotes an elastically deformable, L-shaped spring (resilient member) disposed on a free end side of the arm 29 in opposed relation to the bottom of the lower holder 20, and numeral 31 denotes a side plate disposed outside each guide plate 24. The side plate 31 is formed with an L-shaped slot 31a and a vertical slot (31b), with the pins 26 and 24d being in engagement with the slots 31a and 31b, respectively. Numeral 32 denotes an L-shaped retaining piece mounted on the inner wall surface of the plate 31 and numeral 33 denotes an arm attached pivotably to the outer wall surface of the plate 31. The arm 33 is formed with a radially extending guide slot 33a, with which is engaged the pin 26 which has passed through the slot 31a of the plate 31. The outer periphery of the arm 33 is formed with a gear to which is transmitted a driving force from a motor (not shown).

Numeral 34 denotes an upper plate which is mounted so as to connect the side plates 31 and serve as a cover over the upper holder 22. On the inner surface side of the upper plate 34 is formed a link mechanism 35, which link mechanism has a pair of front ends 35a for abutment with the tape cassette 10. Numeral 36 denotes a pin projecting from the upper plate 34 in opposed relation to each L-shaped retaining piece 32.

Under the construction described above, when the tape cassette 10 is inserted into the holders 20 and 22, the slider 13 moves along the upper surface of the lower holder 20 and an end face thereof is retained by the bent pieces 20c; at the same time, the lugs 20a and 20b of the lower holder 20 come into opposed relation to the retaining apertures 13a and 13b of the slider 13 and push up the lugs 12a of the lower case 12, so that the lower case becomes movable independently of the slider 13. Consequently, the cases 11 and 12 are pushed in to a further extent than the slider 13 by the inserting force of the tape cassette 10 and its upper surface is pressed by the hook 23, while the front end face of the lid 14 is retained by the springs 30. At this time, the slider 13 is held in a somewhat retracted position with respect to the lower case 12 and the elastic plates 21 are urged against the side wall faces of the slider 13, thus creating an eject state (shown in FIG. 5) holding the tape cassette 10 as a whole.

Figure 1:
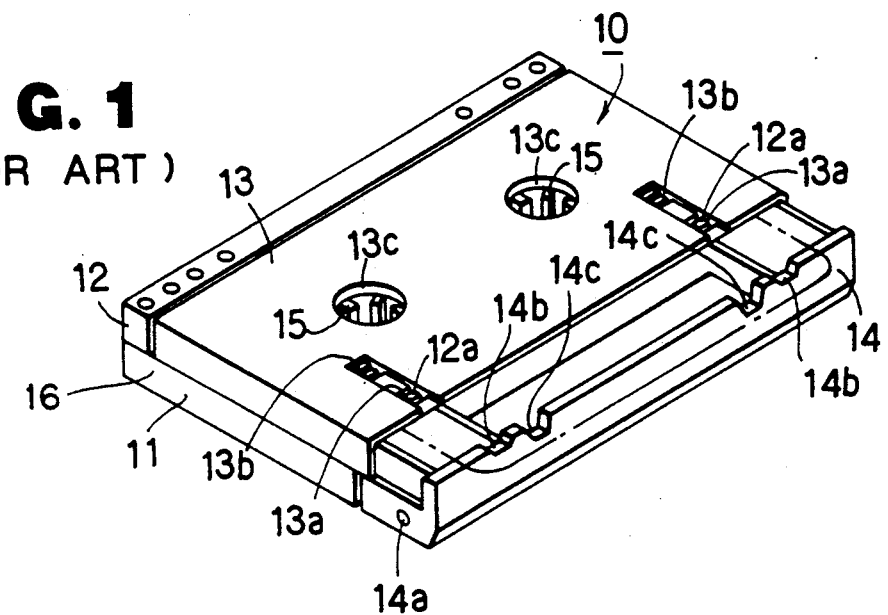
FIG. 1 is a perspective view showing an outline of a tape cassette commonly used in a conventional digital audio tape player.
Figure 4:
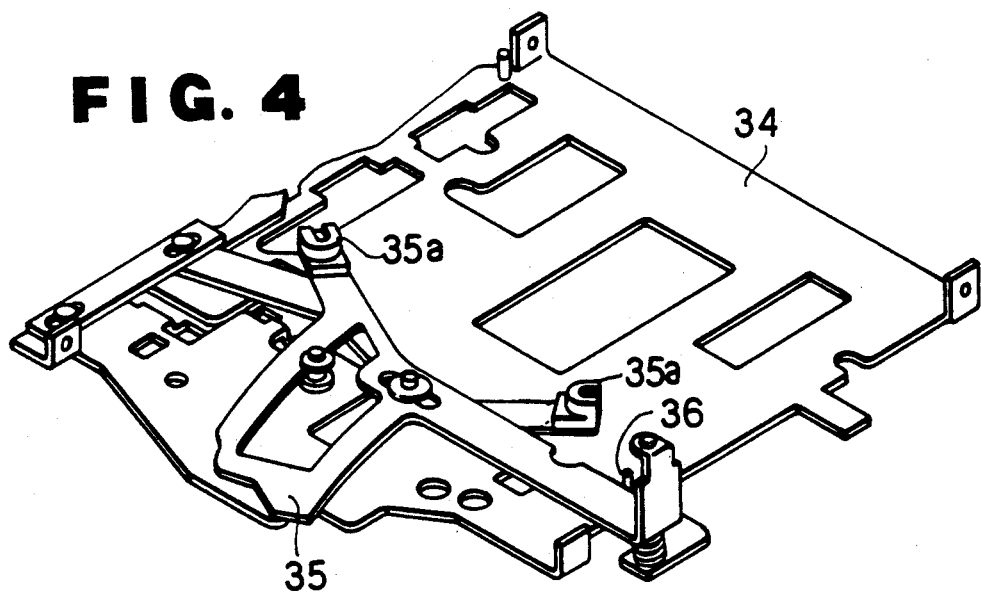
FIGS. 3 and 4 are each an exploded perspective view showing a principal construction in FIG. 2.

Next, when the tape cassette 10 is further pushed in for transfer to a playing state (it is not always necessary to once stop in the eject state), the link mechanism 35 is moved by the lid 14 to turn ON a switch (not shown), or by turning ON a switch which is for transfer to the playing state, an electric current is supplied to the motor and the rotating force of the motor is transmitted to the arms 33. With the resultant rotation of the arms 33 the lower and upper holders 20 and 22 are moved along the guide slots 24a and 24b of the guide plates 24, and when the pins 28b of the shift levers 28 move along inclined portions of the guide slots 24b, as shown in FIG. 6, the shift levers 28 are pivoted downwards, whereby the lower holder 20 is moved in the direction opposite to the advancing direction relative to the upper holder 22. At this time, since the slider 13 is retained by the bent pieces 20c of the lower holder 20, the slider 13 is pushed back with respect to the lower case 12, thus permitting transfer to such an open condition of the slider 13 as shown in FIG. 1. The relative movement of the holders 20 and 22 can be done smoothly by abutment of the lugs 20e and 22b. Further, as the arms 33 rotate and push the holders 20 and 22 forward, since the pins 29b of the arms 29 are in engagement with the guide slots 24b of the guide plates 24 and the pins 27 of the upper holder 22 are in engagement with the guide slots 24a of the guide plates 24, the arms 29 are turned about 30 degrees forwardly upward upon movement along inclined portions of the guide slots 24b. At this time, the lid 14 is positioned above the retaining pieces 32 and the pins 26 of the upper holder 22 are each positioned in the intersecting portion of the L-shaped slot 31a of each side plate 31.

Figure 8:
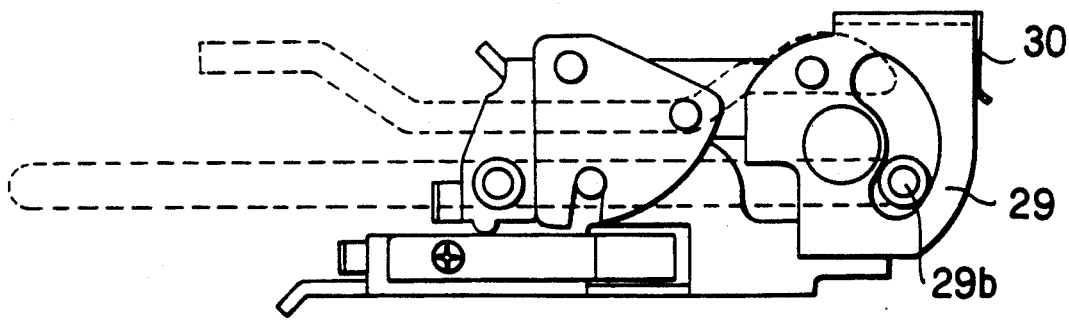
Figure 8:
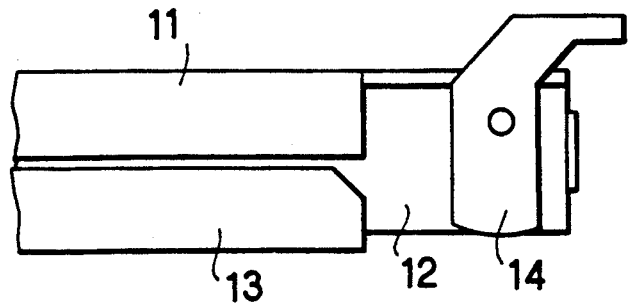

Thereafter, upon further rotation of the arms 33, the pins 26 move downward along the slots 31a and the plates 24 also move downward due to engagement of the pins 24d with the slots 31b, thereby pulling down the tape cassette 10. At this time, the arms 29 are retained by the retaining pieces 32, so the arms further turn and are held in a position turned about 90 degrees with respect to their initial state as shown in FIG. 8, thus causing the magnetic tape to be exposed completely from the cassette case and a guide post (not shown) to be positioned inside the tape. Subsequent movement of the guide post causes the magnetic tape to be pulled out and wound round a rotary cylinder, further causing the reel hubs 15 of the tape cassette 10 to be fitted on the rotating shafts (not shown). The magnetic tape is allowed to travel due to rotation of the rotating shafts. With this travel of the tape, the magnetic head attached to the rotary cylinder detects a signal recorded on the tape.

Where the tape cassette 10 is to be taken out, operation of the eject switch causes the arms 33 to be turned in the reverse direction, so that the guide plates 24 and the holders 20, 22 as a whole move upwards. At this time, in the event the lid 14 is deformed by heat or by any other cause and the lid 14 fails to turn in the closing direction despite the urging force of the spring which urges the lid in the closing direction, the pins 36 come into abutment with the upper surface of the lid 14 and cause the latter to turn in the direction to close the opening of the lower case 12. As the arms 33 further turns, the lid 14 is closed and it becomes possible for the upper case 11 to move to a larger extent than the lower case 12 and return to the initial eject position. If the tape cassette 10 is pulled out in this state, the lugs 12a are pushed in by the lugs 20b and 20a and the upper case 11 moves relative to the slider 13 because the slider is retained by the lugs 20b and 20a and urged toward the lid 14 by the spring. And upon abutment of an end face of the slider 13 with the lid 14, that is, in a completely received state of the magnetic tape, the cassette is drawn out.

There is the advantage that by once holding the tape cassette 10 in the eject state the transfer to the playing state can be done with an electric signal using, for example, a remote control unit.

Thus, in this embodiment of the present invention, the lower and upper holders 20 and 22 which support the slider 13 and the case side respectively of the tape cassette 10 are constituted separately so as to be movable relatively to each other, so it is not necessary to separately provide a drive mechanism for opening the slider 13 of the tape cassette 10. Further, since a a pair of second projections 22c, 22d having a space 22a therebetween are formed in one of the opposed side walls on each side of the lower and upper holders 20 and 22 and a first projection 20d formed on the other and the first projection 20d is engaged in the space 22a between the second projections 22c, 22d such that the space 22a forms a predetermined moving space, the moving distance of the tape cassette 10 required for opening of the slider 13 can be shortened and consequently the tape cassette inserting depth in the apparatus can be made small. Moreover, since it is not necessary to superpose the side walls of the holders 20 and 22 one on the other laterally, the thickness of each side wall portion can be reduced, thus contributing to the reduction in size of the tape player. Further, since pins 25, 26 and 27 are provided in the same level height positions of the first and second projections 20d, 22c, 22d of the lower and upper holders 20 and 22 and they are brought into engagement with the same guide slot 24a of each guide plate 24, it is possible to restrict the height of each guide plate 24 and the guide slots 24b which constitute the opening mechanism of the slider 13 can be disposed in the restricted spaces. Further, the arms 29 are slightly turned by engagement of the pins 29b with the guide slots 24b and thereafter the arms are brought into engagement with the retaining pieces 32 and thereby turned about 90 degrees to open the lid 14. This construction permits smooth turning of the arms 29. Besides, since it is not necessary to provide an inclined portion required for each arm 29 to turn 90 degrees, it is possible to restrict the height of each guide plate 24 and its length in the depth direction. Even in the event the lid 14 fails to turn due to deformation, it can be pushed back by the pins 36 and returned in the direction to close the opening of the cases 11 and 12.

Although the digital audio tape player for automobile has been described in the above embodiment, the present invention can also be applied to a domestic digital audio tape player having a recording function and is further applicable to data recording or reproducing tape players.

In the present invention, as set forth above, an upper holder which supports the case side of the tape cassette and a lower holder which supports the tape cassette slider are provided separately so as to be movable relatively to each other, whereby it is not required at all to use a drive mechanism for driving the tape cassette slider and consequently it becomes possible for the invention to contribute to the reduction in size of the player.

According to the present invention, moreover, a pair of second projections having a space therebetween is formed in one of the opposed side walls on each side of the lower and upper holders and a first projection formed on the other and these first and second projections are brought into engagement with each other through a predetermined moving space, so the moving distance required for opening the tape cassette slider can be shortened, and since it is not necessary to superpose the lower and upper holders one on the other in the thickness direction of the respective side walls, it is possible to reduce the size in the same direction, thereby permitting contribution to the reduction in size of the apparatus.

Further, according to the present invention, first and second projections are formed at the side walls on each side of the lower and upper holders and brought into engagement with each other and pins are attached to the first projection of one side wall and also to the other side wall in an equal level height position to the first projection and brought into engagement with the same linear guide slot, so the guide slots for guiding the lower and upper holders can be used in common and thus it is possible to restrict the height of the guide plates, thereby contributing to the reduction in size of the apparatus.

According to the present invention, moreover, lower and upper holders are disposed in opposed relation to each other through a predetermined moving space and with shift levers being attached pivotably to the upper holder, and first pins attached to the lower holder and through which the shift levers are inserted, as well as second pins fixed to the shift levers, are brought into engagement with linear guide slots and stepped guide slots of guide plates, whereby when the second pins move along inclined portions of the stepped guide slots, the shift levers turn thereby permitting the lower holder to move in the direction opposite to the advancing direction of the tape cassette with respect to the upper holder, so that the tape cassette slider can be moved without increasing the tape cassette inserting distance. As a result, there can be obtained a practical effect that the apparatus can be constituted small in size.

Further, according to the present invention, pins attached to arms are brought into engagement with stepped guide slots of guide plates, whereby the arms can be turned as the said pins move along inclined portions of the guide slots, thus permitting the lid of the tape cassette to be opened and closed smoothly. Besides, since the arms are turned by the pins and the stepped guide slots having inclined portions, it is possible to constitute the apparatus compactly without requiring any complicated construction.

Further, according to the present invention, arms are slightly turned by engagement of pins attached to the arms and inclined portions of guide plates and thereafter the arms are brought into engagement with retaining pieces with vertical movement of the holders, thereby allowing the arms to turn completely to open the lid, and therefore the arms can be turned smoothly. Besides, it is possible to restrict the height of each guide plate and its length in the depth direction because the length of each inclined portion is not made large, thereby permitting contribution to the reduction in size of the tape player.

Additionally, according to the present invention, the tape cassette slider is opened and closed by means of lower and upper holders capable of moving relatively to each other and the tape cassette lid can be opened and closed by movement of the upper holder; besides, since the opening/closing mechanism concerned is constructed so as to be guided by two parallel guide slots formed in the guide plates, it is possible to restrict the vertical and longitudinal sizes of the guide plates, thus permitting the reduction in size of the apparatus.

What is claimed is:

1. A tape cassette loading mechanism in a tape player for loading a tape cassette which encloses a magnetic tape therein by means of an upper case, a lower case, a slider mounted slidably on the lower case, and a lid mounted pivotally with respect to the cases, the upper case and the slider defining side surfaces of the tape cassette extending between the upper case and the slider, said tape cassette loading mechanism comprising:

a lower holder having lugs formed on a bottom thereof for engagement with retaining apertures formed in the slider and also having bent pieces formed at a front end thereof for engaging a front end portion of the slider;

an upper holder formed separately from said lower holder for supporting the upper case; and means for moving said lower and upper holders such that movement of said lower holder relative to said upper holder when said upper holder is supporting the upper case slides the slider in an opposite direction relative to the upper case to move the slider to an open position;

wherein said upper holder is U-shaped and said lower holder and said upper holder include pairs of side walls extending along the side surfaces of the tape cassette, wherein at least one support pin projects from a first portion of each side wall of said lower holder and one support pin projects from each of two second portions of each side wall of said upper holder, and wherein guide plates are disposed along said side walls of said lower and upper holders, said guide plates each including a stepped guide slot and a linear guide slot, said support pins being inserted into said linear guide slots such that said guide plates support said side walls of said lower and upper holders movably in an insertion direction of the tape cassette;

said means for moving said holders including at least one shift lever attached pivotally to each side wall of said upper holder to movably engage respectively one of said support pins of said lower holder, and at least one second pin fixed to each of said shift levers respectively, said second pins being in engagement respectively with said stepped guide slots of said guide plates, whereby when said second pins move along inclined portions of said stepped guide slots with movement of said holders, said shift levers are turned to contact a respective support pin in order to move said lower holder and thus said slider in a direction opposite to an advancing direction of the tape cassette relative to said upper holder to move the slider to an open position; and said second portions of each of the side walls of said upper holder having a space therebetween, said first portions of the side walls of the lower holder extending respectively into said spaces between said second projections such that said spaces form predetermined moving spaces for said first portions, the slider of the tape cassette being opened during a movement of said first portions relative to said second portions in said moving spaces when said lower and upper holders are holding the tape cassette and move in opposite directions.

2. A tape cassette loading mechanism in a tape player for loading a tape cassette which encloses a magnetic tape therein by means of an upper case, a lower case, a slider mounted slidably on the lower case, and a lid mounted pivotally with respect to the cases, the upper case and the slider defining side surfaces of the tape cassette extending between the upper case and the slider, said tape cassette loading mechanism comprising:

a lower holder having lugs formed on a bottom thereof for engagement with retaining apertures formed in the slider and also having bent pieces formed at a front end thereof for engaging a front end portion of the slider;

an upper holder formed separately from said lower holder for supporting the upper case; and means for moving said lower holder and said upper holder such that movement of said lower holder in an opposite direction relative to said upper holder when said upper holder is supporting the upper case slides the slider in an opposite direction relative to the upper case to move the slider to an open position;

wherein both said lower holder and upper said holder are U-shaped and said lower holder and said upper holder include pairs of side walls extending along the side surfaces of the tape cassette, and wherein guide plates are disposed along said side walls of said lower and upper holders to guide said holders in an insertion direction of the tape cassette, the side walls of the lower holder being formed with a first portion and the side walls of the upper holder being formed with a pair of second portions having a space therebetween, said first portion ext ending into the space between said second portions such that said space forms a predetermined moving space for said first portion, the slider of the tape cassette being opened during a movement of said first portion relative to said second portions in said moving space when said lower and upper holders are holding the tape cassette and move in opposite directions;

said moving means including a first pin attached to each of said first portions, at least one shift lever attached pivotally to each of said upper side walls to movably engage respectively each of said first pins, at least one second pin fixed to each of said shift levers respectively, and a third pin attached to each of said second portions generally colinear with the first pins, said first and third pins being inserted in linear guide slots formed in each of said guide plates and said second pins being inserted respectively in stepped guide slots of said guide plates, whereby when said second pins move along inclined portions of said stepped guide slots with movement of said holders, said shift levers are turned to contact the first pin in order to move said lower holder and thus said slider in a direction opposite to an advancing direction of the tape cassette relative so as to move the slider to an open position.

3. A tape cassette loading mechanism in a tape player for loading a tape cassette which encloses a magnetic tape therein by means of an upper case, a lower case, a slider mounted slidably on the lower case, and a lid mounted pivotally with respect to the cases, the upper case and the slider defining side surfaces of the tape cassette extending between the upper case and the slider, said tape cassette loading mechanism including:

- a U-shaped lower holder having a bottom and two side walls for extending along the side surfaces of the tape cassette and supporting the slider, wherein a first projection is formed at an intermediate portion of each of said side walls;
- said U-shaped lower holder having lugs formed on a bottom thereof for engagement with retaining apertures formed in the slider and also having bent pieces formed at a front end thereof for engaging a front end portion of the slider;
- a U-shaped upper holder formed separately from said lower holder and having two side walls, each of said upper holder side walls including two second projections having a space therebetween into which a respective one of said first projections extends, said upper holder also having an upper surface portion which supports the upper case;
- means for moving said holders, said moving means including;
  - at least one first pin projecting respectively from each side all of said lower holder, at least one shift lever attached pivotally to each side wall of said upper holder, said shift levers including a notched portion which engages said at least one first pin projecting from each side wall of said lower holder, and a second pin fixed to each shift lever; and
  - a guide plate disposed beside each of said side walls of said lower and upper holders, each of said guide plates including both a stepped guide slot having an inclined portion, and a linear guide slot;
- said first pins being inserted respectively in said linear guide slots of said guide plates and said second pins being inserted respectively in said stepped guide slots of said guide plates, whereby when said second pins move along said inclined portions of said stepped guide slot with movement of said holders, said shift levers being engaged with the respective first pins in order to move said lower holder in a direction opposite to an advancing direction of the tape cassette so as to move the slider to an open position.

4. A tape cassette loading mechanism in a tape player for loading a tape cassette which encloses a magnetic tape therein by means of an upper case, a lower case, a slider mounted slidably on the lower case, and a lid mounted pivotally with respect to the cases, the upper case and the slider defining side surfaces of the tape cassette extending between the upper case and the slider, said tape cassette loading mechanism including:

- a U-shaped lower holder having a bottom and two side walls extending along the side surfaces of the tape cassette and supporting the slider, wherein a first projection is formed at an intermediate portion of each of said side walls;
- said U-shaped lower holder having lugs formed on a bottom thereof for engagement with retaining apertures formed in the slider and also having bent pieces formed at a front end thereof for engaging a front end portion of the slider;
- a U-shaped upper holder formed separately from said lower holder and having two side walls, each of said upper holder side walls including two second projections having a space therebetween into which a respective one of said first projections extends, said upper holder also having an upper surface portion which supports the upper case;
- means for moving said holders including;
  - at least one first pin projecting respectively from each side wall of said lower holder, at least one shift lever attached pivotally to each side all of said upper holder, said shift levers including a notched portion which engages said at least one first pin projection from each side wall of said lower holder, and a second pin fixed to each shift lever, and at least one third pin projecting respectively from each of said side walls of the upper holder; and
  - at least one arm pivotally attached to each side wall of said upper holder for engaging said lid;
  - a fourth pin fixed to each arm; and
  - a guide plate disposed beside each of said side walls of said lower and upper holders, each of said guide plates including both a stepped guide slot having first and second inclined portions and a linear guide slot formed in parallel with at least one portion of said stepped guide slot,
- said first pins and said third pins being inserted in said linear guide slots of respective guide plates, and said second pins and said fourth pins being inserted in said stepped guide slots of said respective guide plates, said shift levers being meshed with the first pin when said second pins being moved along said first inclined portion in order to move said lower holder in a direction opposite to an advancing direction of the tape cassette relative to said upper holder so as to move the slider to an open position, said arms being turned when said fourth pins move along said second inclined portion so as to open the lid.

5. An apparatus for loading a tape cassette into a tape player, comprising:

- a guide plate having a linear guide slot;
- an upper holder for holding an upper case of the cassette, said upper holder including a first pin inserted into said linear guide slot;
- a lower holder for engaging a slider on a lower case of the cassette, said lower holder including a second pin inserted into said linear guide slot;
- means for moving the tape cassette into position int he tape player;
- means for moving said first and second pins towards each other in said linear guide slot so as to cause said slider to move in a direction opposite to said upper case in order to open the tape cassette;
- wherein said means for moving said first and second pins includes:
- a shift lever, rotatably attached to said upper holder, said shift lever having a notch for engaging said second pin; and
- means for rotating said shift lever when said cassette is moved in an insertion direction, said rotating means rotating said shift lever to engage and move said second pin in said linear guide slot in a direction which is opposite to said insertion direction.

6. An apparatus as claimed in claim 5, wherein:

said guide plate includes a stepped guide slot having a first inclined portion;

said shift lever includes a shift lever pin inserted into said stepped guide plate; and said rotating means includes means for translating said upper holder so that said shift lever is rotated when said shift lever pin translates through the first inclined portion of the stepped guide slot.

7. An apparatus as claimed in claim 6 further comprising means for opening a pivotal lid of said cassette.

8. An apparatus as claimed in claim 7, wherein said lid opening means comprises:
an arm, pivotally attached to said upper holder, including a free end for engaging said lid; and
means for pivoting the arm when the cassette is moved in an insertion direction.

9. An apparatus as claimed in claim 8, wherein:
said stepped guide slot includes a second inclined portion;
said arm includes an arm pin inserted into the stepped guide slot; and
said pivoting means includes means for translating said upper holder so that the arm is pivoted when the pin translates through the second inclined portion of the stepped guide slot.

10. An apparatus as claimed in claim 9 wherein said stepped guide slot includes an elliptical portion at one end of the stepped guide slot.

11. An apparatus for lading a tape cassette into a tape player, comprising:
a guide plate having a linear guide slot;
an upper holder for holding an upper case of he cassette, said upper holder including a first pin inserted into said linear guide slot;
a lower holder for engaging a slider on a lower case of the cassette, said lower holder including a second pin inserted into said linear guide slot;
means for moving the cassette into position int eh tape player;
means for moving said first and second pins in opposite directions towards each other in said guide plate so as to cause said slider o move in a direction opposite to said upper case in order to open the cassette; and
means for opening a pivotal lid of said cassette in order to further open the cassette;
wherein said means for moving said first and second pins includes;
a shift lever, rotatably attached to said upper holder, said shift lever having a notch for engaging said second pin; and
means for rotating said shift lever when said cassette is moved in an insertion direction, said rotating means rotating said shift lever to engage and move said second pin in said linear guide slot in a direction which is opposite to said insertion direction.

12. An apparatus as claimed in claim 11, means includes:
wherein said lid opening means includes:
an arm, pivotally attached to said upper holder, including a free end for engaging said lid; and
means for pivoting the arm when the cassette is moved in said insertion direction.

13. An apparatus as claimed in claim 12, wherein:
said guide plate includes a stepped guide slot having a first inclined portion and a second inclined portion;
said shift lever includes a shift lever pin inserted into said stepped guide plate;
said arm includes an arm pin inserted into the stepped guide slot;
said rotating means includes means for translating said upper holder so that said shift lever is rotated when said shift lever pin translates through the first inclined portion of the stepped guide slot; and
said pivoting means includes means for translating said upper holder so that the arm is pivoted when said arm pin translates through the second inclined portion of the stepped guide slot.

14. An apparatus for loading a tape cassette into a tape player, comprising:
a guide plate having a linear guide slot and a stepped guide slot, said stepped guide slot having a first inclined portion and a second inclined portion;
an upper holder for holding an upper case of the cassette, said upper holder including a first pin inserted into the linear guide slot;
a lower holder for engaging a slider on a lower case of the cassette, said lower holder including a second pin inserted into the linear guide slot;
a shift lever, rotatably attached to said upper holder, said shift lever having a shift lever pin extending into said stepped guide slot and a notch for engaging said second pin;
an arm, pivotally attached to said upper holder, including an arm pin inserted into the stepped guide slot and a free end for engaging a pivotal lid on the cassette;
means for translating said upper holder so that said shift lever is rotated to engage and move said second pin in said linear guide slot and thus said lower holder and slider in a direction which is opposite to an insertion direction when the shift lever pin translates through the first inclined portion of the stepped guide slot; and
means for translating said upper holder so that the arm is pivoted to open the cassette lid when said arm pin translates through the second inclined portion of the stepped guide slot.

* * * * *